US009781600B2

(12) United States Patent
Seo

(10) Patent No.: US 9,781,600 B2
(45) Date of Patent: Oct. 3, 2017

(54) REMOTE CONTROL METHOD BETWEEN MOBILE COMMUNICATION TERMINALS USING PROGRAMS MOUNTED ON MOBILE COMMUNICATION TERMINALS

(71) Applicant: RSUPPORT CO., LTD., Seoul (KR)

(72) Inventor: Hyung Su Seo, Seoul (KR)

(73) Assignee: RSUPPORT CO., LTD., Seoul (KR)

( * ) Notice: Subject to any disclaimer, the term of this patent is extended or adjusted under 35 U.S.C. 154(b) by 158 days.

(21) Appl. No.: 14/562,536

(22) Filed: Dec. 5, 2014

(65) Prior Publication Data

US 2015/0163676 A1 Jun. 11, 2015

(30) Foreign Application Priority Data

Dec. 6, 2013 (KR) ........................ 10-2013-0151741

(51) Int. Cl.
H04W 4/00 (2009.01)
H04W 12/08 (2009.01)
H04W 12/06 (2009.01)
H04M 1/725 (2006.01)

(52) U.S. Cl.
CPC ....... *H04W 12/08* (2013.01); *H04M 1/72522* (2013.01); *H04W 4/001* (2013.01); *H04W 12/06* (2013.01); *H04M 1/72533* (2013.01)

(58) Field of Classification Search
CPC .. H04M 1/72522; H04W 12/08; H04W 4/001
See application file for complete search history.

(56) References Cited

U.S. PATENT DOCUMENTS

| 9,060,057 | B1* | 6/2015 | Danis | H04M 3/42059 |
| 2010/0273449 | A1* | 10/2010 | Kaplan | G06F 21/31 |
| | | | | 455/411 |
| 2012/0329430 | A1* | 12/2012 | Chatani | H04L 12/12 |
| | | | | 455/411 |
| 2014/0208384 | A1* | 7/2014 | Youssefian | H04L 63/0869 |
| | | | | 726/3 |

FOREIGN PATENT DOCUMENTS

| CN | WO 2012136024 A1 * | 10/2012 | ............ H04W 4/005 |
| KR | 20090087197 A | 8/2009 | |
| KR | 20100053805 A | 5/2010 | |
| KR | 20110012099 A | 2/2011 | |
| KR | 20120023254 A | 3/2012 | |

* cited by examiner

*Primary Examiner* — Anthony Addy
*Assistant Examiner* — Martin Chang
(74) *Attorney, Agent, or Firm* — Mintz Levin Cohn Ferris Glovsky and Popeo, P.C.; Kongsik Kim; Jonathon Western

(57) ABSTRACT

A remote control method between a control-side mobile communication terminal and a controlled-side mobile communication terminal is provided which comprises executing remote control programs respectively mounted on the control-side and the controlled-side mobile communication terminals. Intention of a user of the controlled-side mobile communication terminal for accepting a remote control can be confirmed without having to perform a complicated authentication process, and both users' convenience and security can be secured.

2 Claims, 6 Drawing Sheets

REMOTE CONTROL METHOD BETWEEN MOBILE COMMUNICATION TERMINALS USING PROGRAMS MOUNTED ON MOBILE COMMUNICATION TERMINALS

CROSS-REFERENCE TO RELATED APPLICATIONS

This application claims priority to Korean Application No. 10-2013-0151741 filed on Dec. 6, 2013. The application is incorporated herein by reference.

TECHNICAL FIELD

The present invention relates to a remote control method between mobile communication terminals which are mobile stations of a mobile communication network.

RELATED ART

As distribution of high functional mobile communication terminals 10 having an input-output device of a high resolution touch screen, as well as a high-performance control and operation device and a large-capacity memory device, is expanded together with rapid increase of data processing speed through a mobile communication network and wide spread of wireless LANs, conventional works such as connection to the Internet, processing of large-scale multimedia information, and the like that are performed using a desktop computer can be performed through a mobile communication terminal.

Since the high functional mobile communication terminal, generally called as a smart phone, provides an information processing capacity and a graphic user interface (GUI) comparable to a general desktop computer by employing a high-performance control and operation device, a large-capacity memory device and a high-resolution touch screen, it actually performs a function of a portable computer getting out of the functions of a conventional mobile communication terminal limited to a voice communication and a short message service (SMS). However, as a method of using such a mobile communication terminal becomes complicated, most of users unfamiliar with a new communication environment feels difficulty in utilizing the mobile communication terminal and, in addition, suffers from malfunctions and loss of data caused by mishandling and damages such as a burden of excessive communication fees or the like.

Therefore, a communication company attracting the high functional mobile communication terminal as a subscriber, a manufacturing company of the mobile communication terminal, an Internet information providing company associated with a wireless network for distributing paid data or application programs, for example, perform a measurement for an operation error or failure, as well as providing users unfamiliar with handling the high functional mobile communication terminal with a method of connecting to the Internet and transmitting and receiving data or remotely handling the mobile communication terminal, at a remote site by remotely controlling the mobile communication terminal with the consent of a user, as disclosed in, e.g., Korean Patent No. 1066853.

That is, as shown in FIG. 1, a computer 40 connected to the Internet connects to a wireless network through a gateway server 30 and remotely controls a mobile communication terminal 10. Here, the computer 40 is a computer 40 of a counselor of a communication company having a remote control authority as described above, and although it may be advantageous in ensuring security since the remote control authority is granted before the remote control is begun by an operation subject of a mobile communication network 21 or a wireless LAN 22 which functions as a path of the remote control and, in addition, it goes through a procedure of obtaining complicated authentication and consent of a user of the controlled-side mobile communication terminal 10, it is far from freely performing the remote control by general users not familiar with mobile communication technologies.

As shown in FIG. 2, through a remote control between the mobile communication terminals 10, restrictions on qualification and location of a control-side user can be eliminated in performing the remote control, and various demands of the user such as a remote control between family members or friends can be met, as disclosed in, e.g., Korean Application Publication No. 2011-109359.

Since the prior art remote control between mobile communication terminals 10 begins when one of the control-side and controlled-side mobile communication terminals 10 proposes or requests a remote control and the other of the mobile communication terminals 10 accepts the proposal or request, it does not fully satisfy user convenience and security.

That is, since the remote control immediately begins if a user of the controlled-side mobile communication terminal 10b unconsciously accepts a one-sided request for acceptance of a remote control of the control-side mobile communication terminal 10a, the risk of progressing the remote control unintended by the user of the controlled-side mobile communication terminal 10b is very high, and thus a serious problem such as leaking personal information or the like may occur.

Particularly, in the case of the high functional mobile communication terminal 10, a variety of application programs are mounted and executed, and updates of the application programs are continuously performed through the wireless network 20, and thus messages requesting acceptance of the updates of the application programs are frequently output on the screen of the mobile communication terminal 10. In addition, since mobile communication terminals 10 of most of social network service (SNS) users maintain a state of being connected to a corresponding SNS at all times, a variety of messages received through the SNS are frequently output on the screen of the mobile communication terminal 10, and thus it is general that most of users of the high functional mobile communication terminals 10 habitually confirm or select acceptance without any special suspect, and when a remote control is performed between the mobile communication terminals 10 abusing the bad habit of the general users in using the mobile communication terminal 10, users of an unspecified number of controlled-side mobile communication terminals 10b may be severely damaged.

Therefore, although it may be possible to consider a method of strictly confirming eligibility of the control-side mobile communication terminal 10a by requesting a user of the control-side mobile communication terminal 10a to input authentication information such as identification (ID), a password and the like before a remote control begins between the mobile communication terminals 10 or formalizing the procedure of accepting the remote control by the controlled-side mobile communication terminal 10b into steps and strictly confirming the intention of the user of the controlled-side mobile communication terminal 10b at each step, this also may induce various problems described below from the aspect of the configuration of the entire system and convenience of the user.

First, when authentication information, such as an ID, a password and the like, of the control-side mobile communication terminal 10a is requested, an authentication database 32a for storing the authentication information should be constructed in the controlled-side mobile communication terminal 10b so that validity of the authentication information may be confirmed, and since this is based on the assumption that a prior consultation has been made between a user of the control-side mobile communication terminal 10a and a user of the controlled-side mobile communication terminal 10b, although this method can be applied to a remote control within a user group configured of an extremely small number of members, fundamentally, this method cannot be applied to a remote control between users of an unspecified number of mobile communication terminals 10.

Particularly, since remote control of a mobile communication terminal 10 is generally performed targeting a user unfamiliar with using the mobile communication terminal 10, it may be a method which is almost impossible for the user unfamiliar with using the mobile communication terminal 10 to previously set and manage authentication information of the control-side mobile communication terminal 10a, which will control the mobile communication terminal 10 of the user, in the form of the authentication database 32a.

Although a method of constructing an authentication server 31 and an authentication database 32b for confirming authentication information on a communication network in which a remote control is performed between the mobile communication terminals 10 and granting eligibility to the control-side mobile communication terminal 10a may be considered as another method of confirming validity of the authentication information, a large amount of cost is required to set and manage authentication information of an unspecified number of mobile communication terminals 10, and, in addition, it is almost impossible for general users of an unspecified number of mobile communication terminals 10 to provide authentication information including personal information in advance for a remote control service, for which it is unknown when the service will be used, and voluntarily perform a troublesome procedure of consenting to construction of the authentication database 32b.

Although the authentication database 32b for storing the authentication information of the unspecified number of mobile communication terminals 10 and the authentication server 31, which is a management server thereof, may be constructed, it is accompanied with a complicated process in which the controlled-side mobile communication terminal should reconfirm eligibility of the control-side mobile communication terminal 10a from the authentication server 31 when the control-side mobile communication terminal 10a attempts connection to the controlled-side mobile communication terminal 10b after obtaining confirmation of the authentication server 31.

Like this, since the remote control of the prior art between mobile communication terminals 10 has a serious problem in ensuring security, as well as in convenience of a user, distribution of a remote control service between the mobile communication terminals 10 provided for general users is extremely poor.

SUMMARY

Therefore, the present invention has been made in view of the above problems, and according to one aspect of the present invention, there is provided a remote control method between mobile communication terminals using programs mounted on the mobile communication terminals, in which the mobile communication terminals 10 are mobile stations of a mobile communication network 21, and an intermediating server 35 connected to the mobile communication terminals 10 through a wireless network 20 is configured, the method including the steps of: executing remote control programs respectively mounted on a control-side mobile communication terminal 10a and a controlled-side mobile communication terminal 10b; transmitting, by the remote control program of the control-side mobile communication terminal 10a, connection information including a phone number of the corresponding mobile communication terminal 10a and a phone number of the controlled-side mobile communication terminal 10b to the intermediating server 35 through the wireless network 20; transmitting, by the remote control program of the controlled-side mobile communication terminal 10b, connection information including the phone number of the corresponding mobile communication terminal 10b and the phone number of the control-side mobile communication terminal 10a to the intermediating server 35 through the wireless network 20; comparing, by the intermediating server 35, the connection information received from the control-side mobile communication terminal 10a and the controlled-side mobile communication terminal 10b and establishing, if the connection information matches, a communication session between the control-side mobile communication terminal 10a and the controlled-side mobile communication terminal 10b; and transmitting, by the remote control program of the controlled-side mobile communication terminal 10b, screen information to the control-side mobile communication terminal 10a, and transmitting, by the remote control program of the control-side mobile communication terminal 10a, a control command to the controlled-side mobile communication terminal 10b.

According to another aspect of the present invention, there is provided a remote control method between mobile communication terminals using programs mounted on the mobile communication terminals, in which the mobile communication terminals 10 are mobile stations of a mobile communication network 21 which provides an originating number transmission service, and an intermediating server 35 connected to the mobile communication terminals 10 through a wireless network 20 is configured, the method including the steps of: executing remote control programs respectively mounted on a control-side mobile communication terminal 10a and a controlled-side mobile communication terminal 10b; transmitting, by the remote control program of the control-side mobile communication terminal 10a, connection information including a phone number of the controlled-side mobile communication terminal 10b to the intermediating server 35 through the mobile communication network 21; transmitting, by the remote control program of the controlled-side mobile communication terminal 10b, connection information including a phone number of the control-side mobile communication terminal 10a to the intermediating server 35 through the mobile communication network 21; updating, by the intermediating server 35, the connection information by adding a corresponding originating number transmitted from the mobile communication network 21 to the connection information received from the control-side mobile communication terminal 10a and the controlled-side mobile communication terminal 10b, comparing the updated connection information, and establishing, if the connection information matches, a communication session between the control-side mobile communication terminal 10*a* and the controlled-side mobile communication terminal 10*b*; and transmitting, by the remote control program of the controlled-side mobile communication terminal 10*b*, screen information to the control-side mobile communication terminal 10*a*, and transmitting, by the remote control program of the control-side mobile communication terminal 10*a*, a control command to the controlled-side mobile communication terminal 10*b*.

DETAILED DESCRIPTION

The detailed configuration and processing procedure of the invention will be hereafter described with reference to the accompanying drawings.

Figure 1:
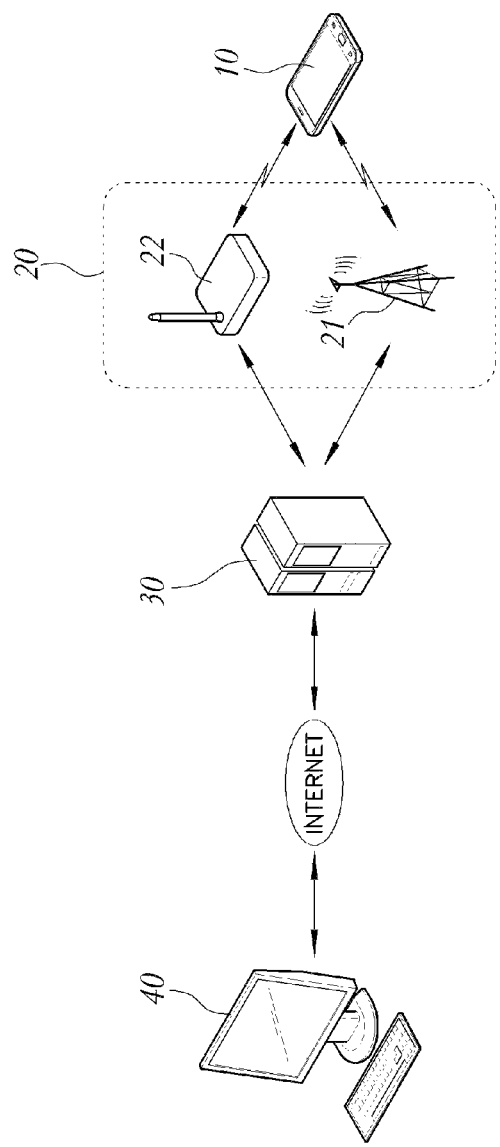
FIG. 1 illustrates a conventional remote control method between a computer and a mobile communication terminal.
Figure 2:
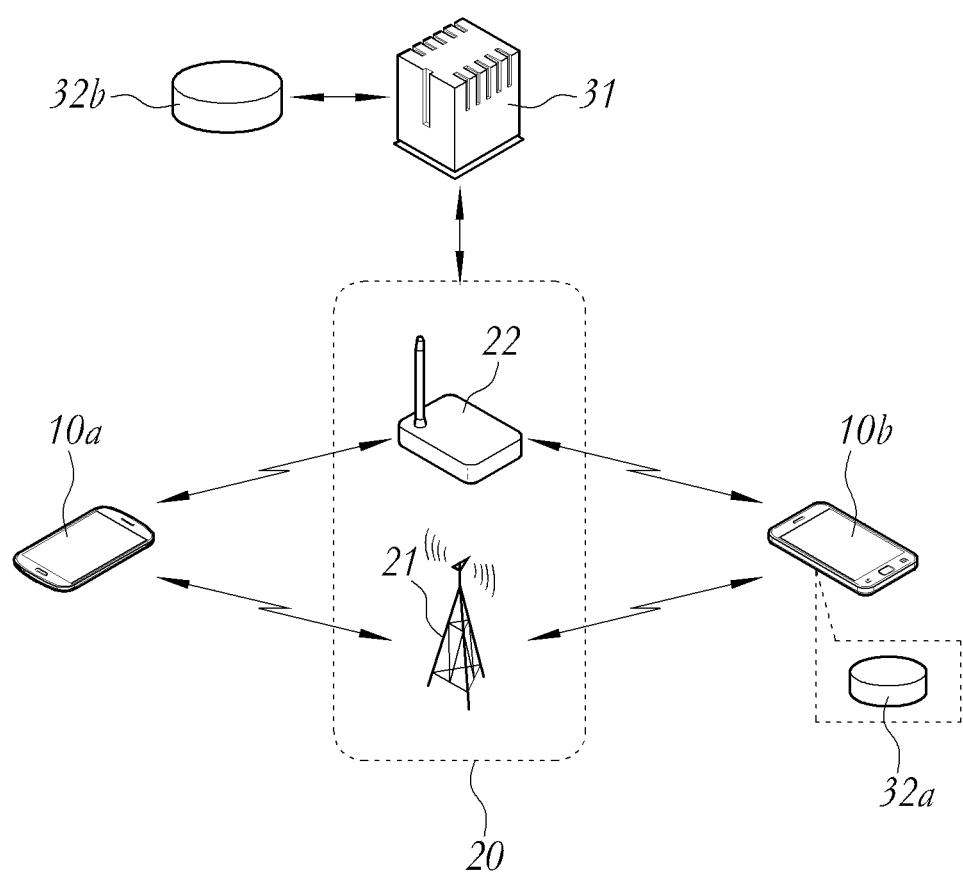
FIG. 2 illustrates a conventional remote control method between mobile communication terminals.
Figure 3:
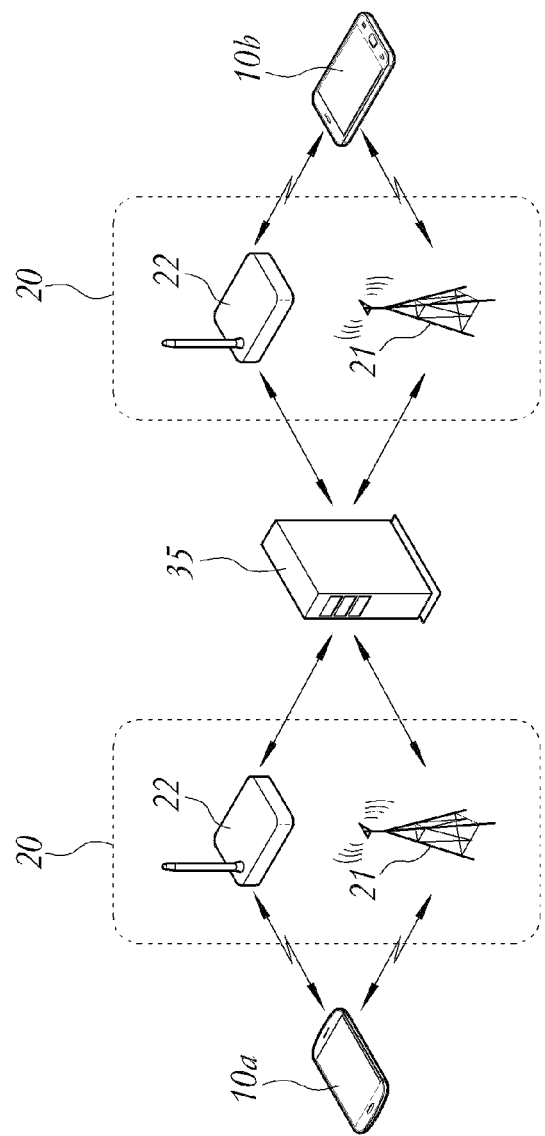
FIG. 3 is illustrates a remote control method between mobile communication terminals according to an embodiment of the present invention.

FIG. 3 illustrates a remote control method between mobile communication terminals according to an embodiment of the present invention. The control method is performed by a mobile communication terminal 10 which is a mobile station of a mobile communication network 21. A wireless network 20 including all wireless-based communication networks that can be connected by the mobile communication terminal 10, such as the mobile communication network 21, a wireless LAN 22 and the like, and an intermediating server 35 connected to the wireless network 20 are involved, as described in detail below.

In addition, although it is not shown in the figure, a remote control program for exchanging control signals and screen information in performing a remote control between the mobile communication terminals 10 is mounted on the mobile communication terminals 10, and the remote control program may be mounted in a variety of forms such as an application program executed under the operating system of the mobile communication terminal 10, a program module included in the operating system and the like.

Figure 4:
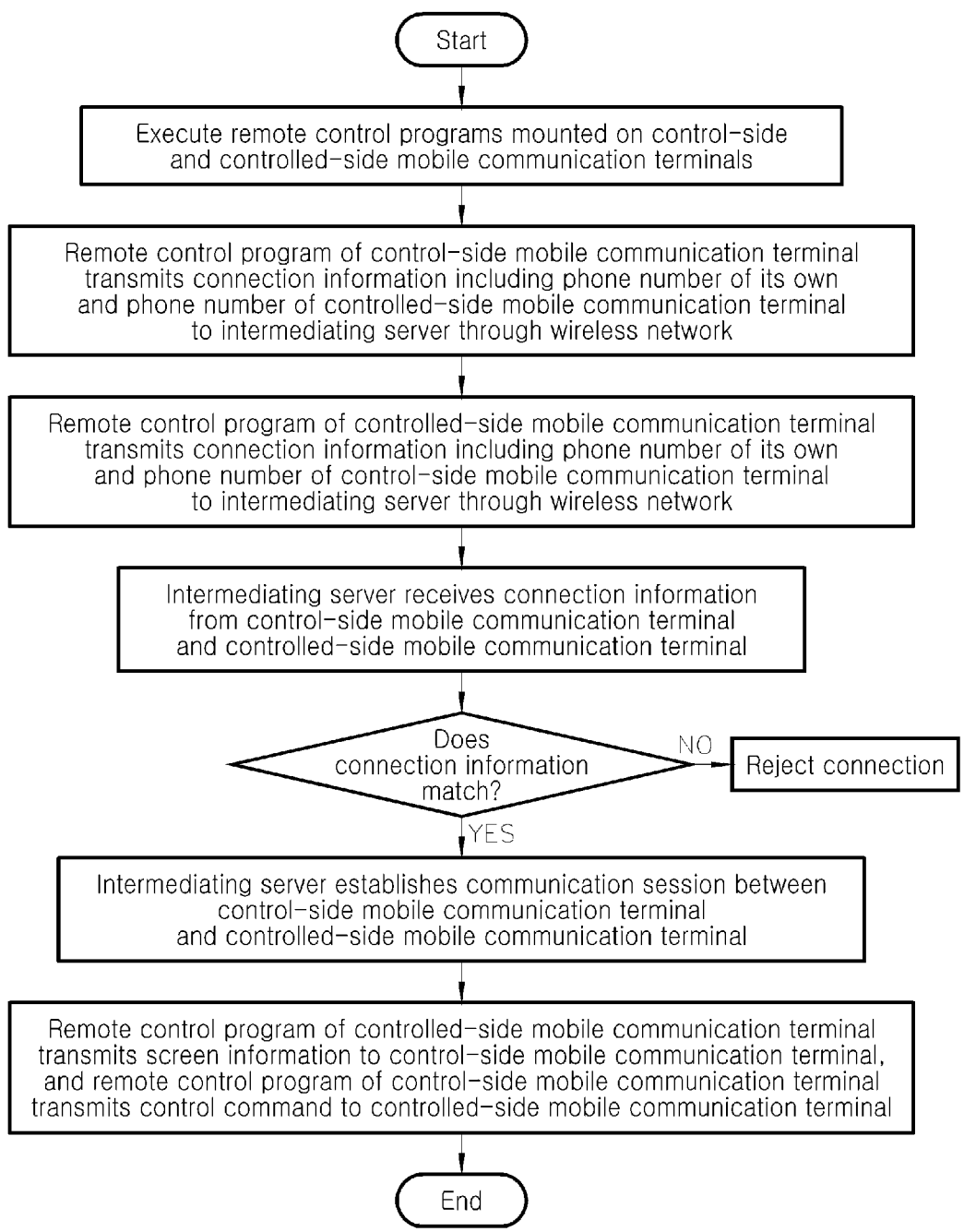
FIG. 4 is a flowchart of a remote control method according to an embodiment of the present invention.

A remote control method according to an embodiment of the present invention starts its operation, as shown in FIG. 4, by executing the remote control programs respectively mounted on a control-side mobile communication terminal 10*a* and a controlled-side mobile communication terminal 10*b*.

Figure 5:
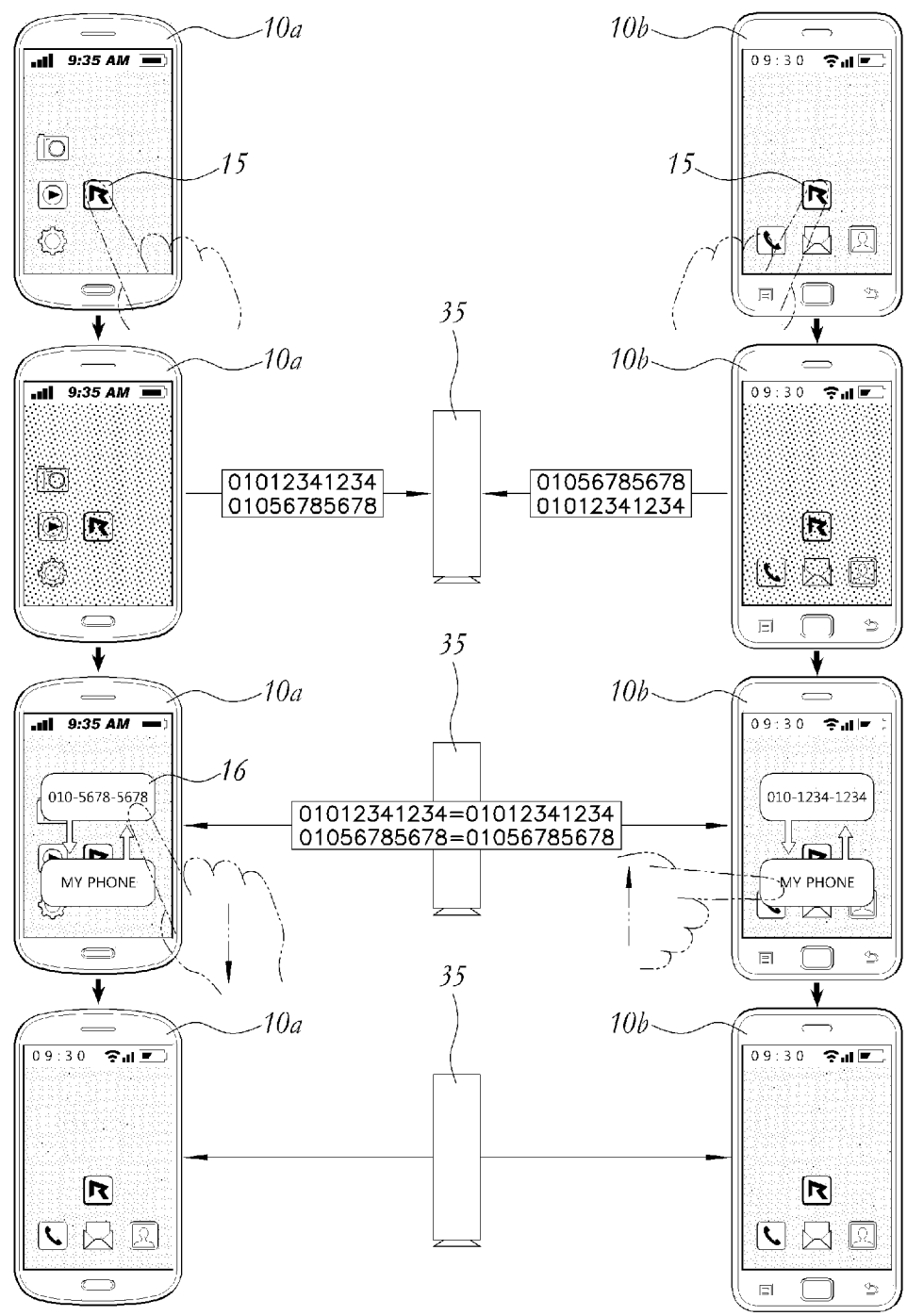
FIG. 5 is a view showing examples of a screen of a mobile communication terminal at each step of a remote control method according to an embodiment of the present invention.
Figure 6:
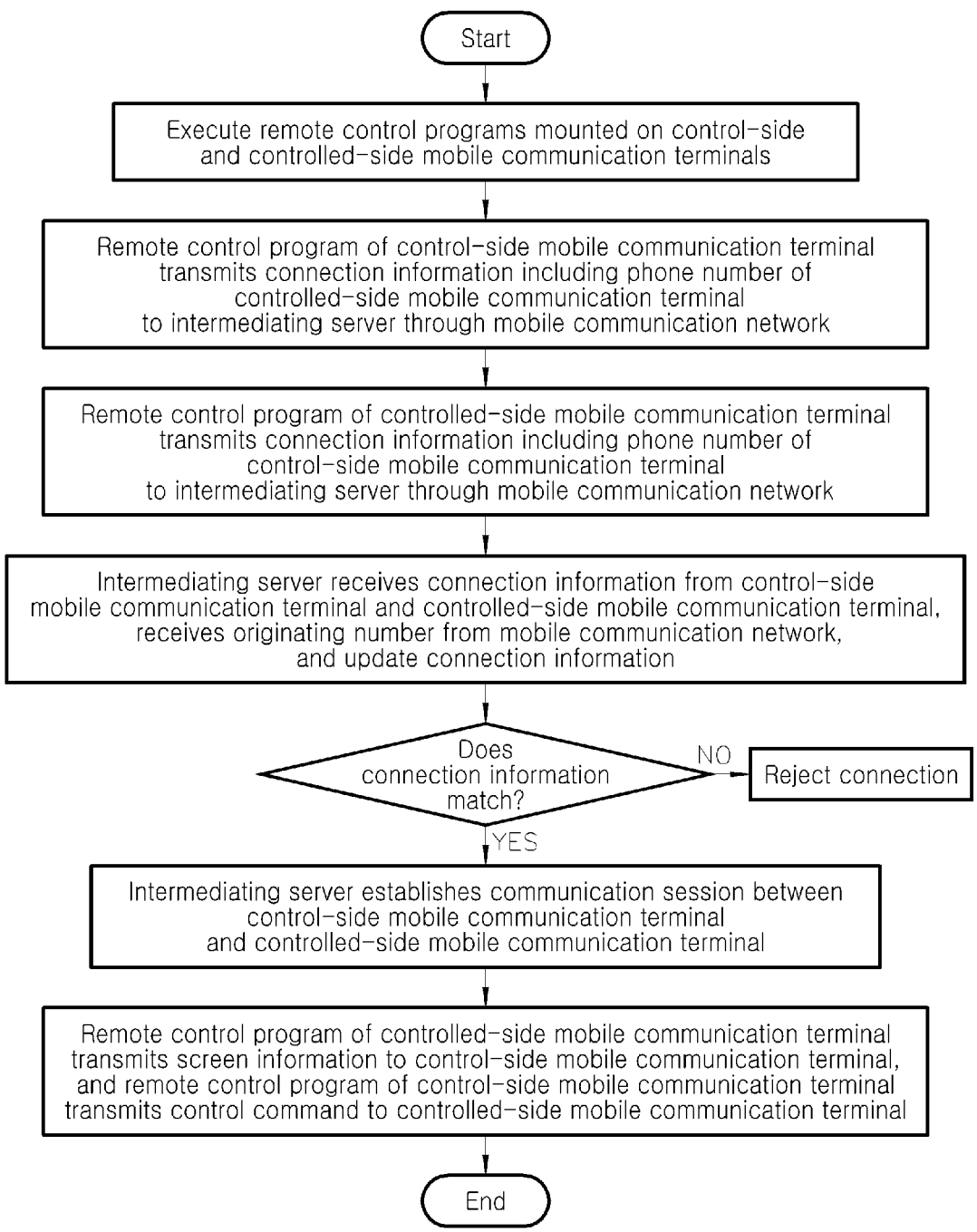
FIG. 6 is a flowchart of a remote control method according to an embodiment of the present invention in which an originating number transmission service of a mobile communication network.

As shown in FIG. 5, the remote control program may be executed through handling of a user, such as touching an icon 15 implemented on the touch screen of the mobile communication terminal 10, and since the control method is established based on execution states of the remote control programs mounted on the control-side mobile communication terminal 10*a* and the controlled-side mobile communication terminal 10*b*, it may be configured to be accompanied with active handling of the user of the controlled-side mobile communication terminal 10*b*, and thus a remote control performed against the intention of the user of the controlled-side mobile communication terminal 10*b* can be effectively prevented.

If once the remote control programs are executed, the remote control program of the control-side mobile communication terminal 10*a* transmits connection information including a phone number of a corresponding mobile communication terminal 10*a*, i.e., the control-side mobile communication terminal 10*a*, and a phone number of the controlled-side mobile communication terminal 10*b* to the intermediating server 35 through the wireless network 20, and the remote control program of the controlled-side mobile communication terminal 10*b* transmits connection information including a phone number of a corresponding mobile communication terminal 10*b*, i.e., the controlled-side mobile communication terminal 10*b*, and a phone number of the control-side mobile communication terminal 10*a* to the intermediating server 35 through the wireless network 20.

FIG. 5 shows examples of specific forms of such connection information, and as shown in the figure, the connection information transmitted from the control-side mobile communication terminal 10*a* may have a form combining a phone number of its own and a phone number of the controlled-side mobile communication terminal 10*b*, which is a target of the remote control, and the connection information transmitted from the controlled-side mobile communication terminal 10*b* may have a form combining a phone number of its own and a phone number of the control-side mobile communication terminal 10*a*, which is a subject of the remote control.

The connection information of a form combining a phone number of its own and a phone number of the counterpart is created by the remote control program, and the phone number of its own may be set in a method of extracting the phone number from the operating system or a memory device of the mobile communication terminal 10 by the remote control program or inputting the phone number by the user when the remote control program is initially installed, and the phone number of the counterpart may be set in a method of grasping the phone number of the communicating counterpart at the time point of attempting a remote control or selecting the phone number by the user from a list of phone numbers recorded in the memory device of the mobile communication terminal 10 of its own.

That is, since the object of the present invention is a remote control between mobile communication terminals 10 of general users as described above, a remote control between family members or friends may be assumed, for example. However, in this case, since it is general that a voice communication is preceded before a remote control is attempted or a remote control accompanied with a voice communication is attempted, it is possible to apply a method of extracting a phone number of a communicating counterpart by the remote control program at the time point of attempting the remote control.

Particularly, since the controlled-side mobile communication terminal 10*b* actively and clearly specifies the control-side mobile communication terminal 10*a*, the method of determining a phone number of a counterpart in advance and attempting a remote control is advantageous in ensuring security compared to the remote control of the prior art between mobile communication terminals 10 based on a one-sided request for acceptance of a remote control of the control-side mobile communication terminal 10a and simple acceptance of the request by the controlled-side mobile communication terminal 10b.

If transmission of the connection information of the remote control program of the control-side mobile communication terminal 10a and the remote control program of the controlled-side mobile communication terminal 10b is completed, a step of comparing, by the intermediating server 35, the connection information received from the control-side mobile communication terminal 10a and the controlled-side mobile communication terminal 10b and, if the connection information matches, establishing a communication session between the control-side mobile communication terminal 10a and the controlled-side mobile communication terminal 10b is performed.

Here, as shown in FIG. 5, match of the connection information means a state in which the phone number of the controlled-side mobile communication terminal 10b transmitted by the control-side mobile communication terminal 10a matches the phone number of the controlled-side mobile communication terminal 10b transmitted by the controlled-side mobile communication terminal 10b and, at the same time, the phone number of the control-side mobile communication terminal 10a transmitted by the control-side mobile communication terminal 10a matches the phone number of the control-side mobile communication terminal 10a transmitted by the controlled-side mobile communication terminal 10b.

If a communication session is established between the control-side mobile communication terminal 10a and the controlled-side mobile communication terminal 10b, a step of transmitting screen information to the control-side mobile communication terminal 10a by the remote control program of the controlled-side mobile communication terminal 10b and transmitting a control command to the controlled-side mobile communication terminal 10b by the remote control program of the control-side mobile communication terminal 10a is performed, and thus a remote control between the mobile communication terminals 10 begins.

That is, as shown in FIG. 5, the screen of the controlled-side mobile communication terminal 10b is displayed on the control-side mobile communication terminal 10a without making any adjustments, and as the user of the control-side mobile communication terminal 10a handles the screen, the controlled-side mobile communication terminal 10b is handled in the same way.

On the other hand, a process of confirming the intention of the user may be performed in the process of establishing a communication session and beginning a remote control between the control-side mobile communication terminal 10a and the controlled-side mobile communication terminal 10b, and as shown in FIG. 5, an intuitive user interface for requesting acceptance of a remote control or confirming an intention of accepting the remote control can be implemented by outputting display objects 16 expressing the mobile communication terminal 10 of the user and the mobile communication terminal 10 of the counterpart on the touch screens of the mobile communication terminals 10 and performing a gesture of dragging the display objects by the user.

Like this, when the control-side mobile communication terminal 10a and the controlled-side mobile communication terminal 10b transmit phone numbers of their own and the counterpart to the intermediating server 35 as connection information and the intermediating server 35 establishes a communication session between the control-side mobile communication terminal 10a and the controlled-side mobile communication terminal 10b using the transmitted connection information as a medium, the phone numbers are unique call numbers assigned to the mobile communication terminals 10, i.e., unique numbers which are not overlapped in a Public Switched Telephone Network (PSTN), as well as in the mobile communication network 21, and thus stability and correctness can be ensured in operating the communication session.

As described above, the connection information transmitted from the remote control program mounted on the mobile communication terminal 10 is configured of the phone number of the mobile communication terminal 10 of its own and the phone number of the mobile communication terminal 10 of the counterpart, and if the intermediating server 35 accepts the connection information transmitted by the remote control program without verification and establishes a communication session, a weak point in security may be exposed.

That is, when the connection information is created using a manipulated phone number, not an actual phone number of a corresponding mobile communication terminal 10, by manipulating the remote control program of the control-side mobile communication terminal 10a attempting a remote control, a user of the controlled-side mobile communication terminal 10b may accept the remote control by mistaking the control-side mobile communication terminal 10a for a mobile communication terminal 10 of a family member or a friend.

Therefore, the present invention may fundamentally prevent an attempt of a remote control from an unqualified person by updating the connection information by utilizing an originating number transmission service of the mobile communication network 21.

Another embodiment of the present invention utilizing the originating number transmission service of the mobile communication network 21 is also performed by a mobile communication terminal 10 which is a mobile station of the mobile communication network 21, a wireless network 20 including all wireless-based communication networks that can be connected by the mobile communication terminal 10, such as the mobile communication network 21 which provides the originating number transmission service, a wireless LAN 22 and the like, an intermediating server 35 connected to the wireless network 20, and a remote control program mounted on the mobile communication terminal 10, and as shown in FIG. 4, the remote control method begins its operation by executing the remote control programs respectively mounted on a control-side mobile communication terminal 10a and a controlled-side mobile communication terminal 10b.

Next, a step of transmitting connection information including the phone number of the controlled-side mobile communication terminal 10b to the intermediating server 35 through the mobile communication network 21 by the remote control program of the control-side mobile communication terminal 10a and a step of transmitting connection information including the phone number of the control-side mobile communication terminal 10a to the intermediating server 35 through the mobile communication network 21 by the remote control program of the controlled-side mobile communication terminal 10b are performed.

If each of the mobile communication terminals 10 transmits the phone number of a counterpart to the intermediating server 35 through the mobile communication network 21, a step of updating, by the intermediating server 35, the connection information by adding a corresponding originating number transmitted from the mobile communication network 21 to the connection information received from the control-side mobile communication terminals 10a and the controlled-side mobile communication terminals 10b, comparing the update connection information, and, if the connection information matches, establishing a communication session between the control-side mobile communication terminal 10a and the controlled-side mobile communication terminal 10b is performed.

That is, it is not that the remote control program of a corresponding mobile communication terminal 10 combines the phone number of the mobile communication terminal 10 transmitting the connection information with the connection information and transmits the connection information and the intermediating server 35 simply accepts the connection information, but each mobile communication terminal 10 transmits a phone number of a counterpart to the intermediating server 35 as connection information, and a control server acquires an actual phone number of the mobile communication terminal 10 that has transmitted the connection information from the mobile communication network 21 by utilizing an originating number transmission service and combines the actual phone number with the connection information, and thus possibility of manipulating the phone number included in the connection information can be prevented.

If a communication session is established between the control-side mobile communication terminal 10a and the controlled-side mobile communication terminal 10b, a step of transmitting screen information to the control-side mobile communication terminal 10a by the remote control program of the controlled-side mobile communication terminal 10b and transmitting a control command to the controlled-side mobile communication terminal 10b by the remote control program of the control-side mobile communication terminal 10a is performed, and thus a remote control between the mobile communication terminals 10 begins.

As described above, attempts of a malicious remote control can be effectively prevented and the remote control can be safely performed between mobile communication terminals 10 by establishing a communication session between the control-side mobile communication terminal 10a and the controlled-side mobile communication terminal 10b by utilizing the originating number transmission service of the mobile communication network 21.

Since an intention of the user of the controlled-side mobile communication terminal 10b for accepting the remote control can be clearly confirmed without the complicated handling and authenticating procedure, convenience and security of a user can be simultaneously secured in performing a remote control between the mobile communication terminals 10.

In addition, since a remote control service can be stably provided between the mobile communication terminals 10 without constructing the authentication database 32 for storing authentication information of an unspecified number of mobile communication terminals 10 and the authentication server 31 in advance, an effect of drastically saving the cost consumed for providing the service and revitalizing related services can be obtained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A remote control method between mobile communication terminals using programs mounted on the mobile communication terminals, in which the mobile communication terminals are mobile stations of a mobile communication network, and an intermediating server connected to the mobile communication terminals through a wireless network is configured, the method comprising the steps of:
   executing remote control programs respectively mounted on a control-side mobile communication terminal and a controlled-side mobile communication terminal;
   transmitting, by the remote control program of the control-side mobile communication terminal, connection information including a first phone number of the control-side mobile communication terminal and a first phone number of the controlled-side mobile communication terminal to the intermediating server through the wireless network;
   transmitting, by the remote control program of the controlled-side mobile communication terminal, connection information including a second phone number of the controlled-side mobile communication terminal and a second phone number of the control-side mobile communication terminal to the intermediating server through the wireless network;
   authenticating, by the intermediating server, a remote control session in which the control-side mobile communication terminal remotely controls the controlled-side mobile communication terminal by comparing the connection information received from the control-side mobile communication terminal to the connection information received from the controlled-side mobile communication terminal;
   authorizing, by the intermediating server, the remote control session to enable the control-side mobile communication terminal to remotely control the controlled-side mobile communication terminal when the connection information received from the control-side mobile communication terminal matches the connection information received from the controlled-side mobile communication terminal; and
   in response to the remote control session being authorized, transmitting, by the remote control program of the controlled-side mobile communication terminal, screen information to the control-side mobile communication terminal, and transmitting, by the remote control program of the control-side mobile communication terminal, a control command to the controlled-side mobile communication terminal,
   wherein the connection information received from the control-side mobile communication terminal matches the connection information received from the controlled-side mobile communication terminal when:
      the first phone number of the control-side mobile communication terminal included in the connection information received from the control-side mobile communication terminal matches the second phone number of the control-side mobile communication terminal included in the connection information received from the controlled-side mobile communication terminal, and
      the first phone number of the controlled-side mobile communication terminal included in the connection information received from the control-side mobile communication terminal matches the second phone number of the controlled-side mobile communication terminal included in the connection information received from the controlled-side mobile communication terminal.

2. A remote control method between mobile communication terminals using programs mounted on the mobile communication terminals, in which the mobile communication terminals are mobile stations of a mobile communication network which provides an originating number transmission service, and an intermediating server connected to the mobile communication terminals through a wireless network is configured, the method comprising the steps of:

executing remote control programs respectively mounted on a control-side mobile communication terminal and a controlled-side mobile communication terminal;

transmitting, by the remote control program of the control-side mobile communication terminal, connection information including a phone number of the controlled-side mobile communication terminal to the intermediating server through the mobile communication network;

transmitting, by the remote control program of the controlled-side mobile communication terminal, connection information including a phone number of the control-side mobile communication terminal to the intermediating server through the mobile communication network;

adding, by the intermediating server, an originating number of the control-side mobile communication terminal transmitted from the mobile communication network to the connection information received from the control-side mobile communication terminal;

adding, by the intermediating server, an originating number of the controlled-side mobile communication terminal transmitted from the mobile communication network to the connection information received from the controlled-side mobile communication terminal;

authenticating, by the intermediating server, a remote control session in which the control-side mobile communication terminal remotely controls the controlled-side mobile communication terminal by comparing the connection information received from the control-side mobile communication terminal to the connection information received from the controlled-side mobile communication terminal;

authorizing, by the intermediating server, the remote control session to enable the control-side mobile communication terminal to remotely control the controlled-side mobile communication terminal when the connection information received from the control-side mobile communication terminal matches the connection information received from the controlled-side mobile communication terminal; and in response to the remote control session being authorized, transmitting, by the remote control program of the controlled-side mobile communication terminal, screen information to the control-side mobile communication terminal, and transmitting, by the remote control program of the control-side mobile communication terminal, a control command to the controlled-side mobile communication terminal, wherein the connection information received from the control-side mobile communication terminal matches the connection information received from the controlled-side mobile communication terminal when:

the phone number of the controlled-side mobile communication terminal included in the connection information received from the control-side mobile communication terminal matches the originating number of the controlled-side mobile communication terminal added to the connection information received from the controlled-side mobile communication terminal, and the phone number of the control-side mobile communication terminal included in the connection information received from the controlled-side mobile communication terminal matches the originating number of the control-side mobile communication terminal added to the connection information received from the control-side mobile communication terminal.

* * * * *